UNITED STATES PATENT OFFICE.

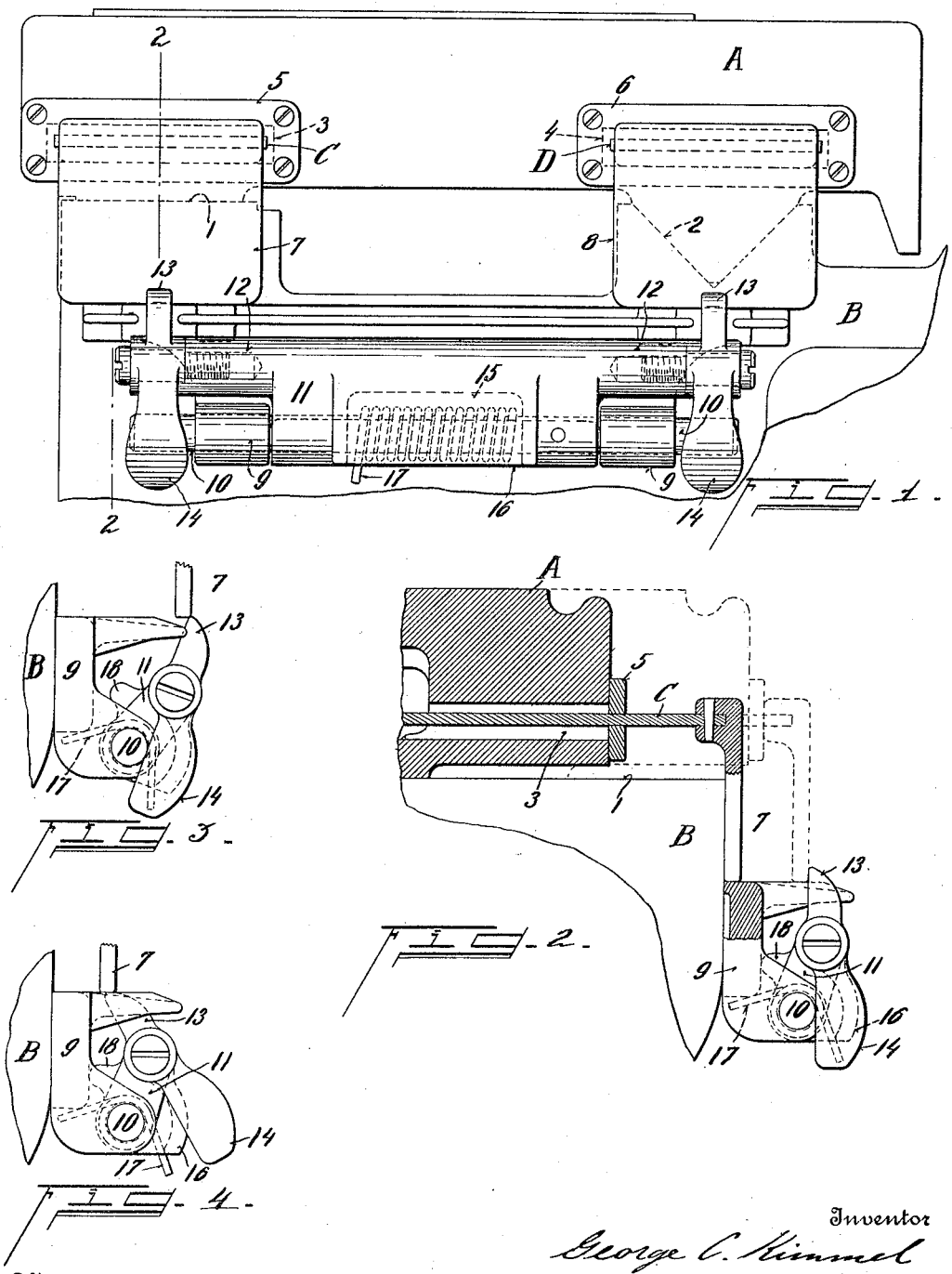

GEORGE C. KIMMEL, OF CINCINNATI, OHIO, ASSIGNOR TO THE CINCINNATI GRINDER COMPANY, OF CINCINNATI, OHIO, A CORPORATION OF OHIO.

EXTENSION-SLIDE.

1,102,416.  Specification of Letters Patent.   Patented July 7, 1914.

Application filed January 17, 1914. Serial No. 812,670.

*To all whom it may concern:*

Be it known that I, GEORGE C. KIMMEL, a citizen of the United States, and residing at Cincinnati, in the county of Hamilton and State of Ohio, have invented a new and Improved Extension-Slide, of which the following specification is a full disclosure.

My invention pertains to certain new and useful improvements in machine tools, and relates more particularly to the reciprocating work supporting table and its slide-ways.

One of the objects of this invention is to provide cover-plates for the slide-ways mounted in extensible relation with the table and adapted to be withdrawn therefrom to form a protecting cover for said slide-ways.

Another object is to provide stop members for the cover-plates adapted to engage the table supporting carriage to limit the movement of said cover-plates in one direction.

Another object is to provide restraining mechanism mounted upon the supporting carriage and adapted to be engaged by the stop members yieldingly to restrain the cover-plates against movement during a part of the return travel of the table.

Other novel features of construction and arrangements of parts are made apparent by the accompanying drawings which, while illustrating a preferred form of embodiment of this invention, are only intended to present to those skilled in this art the underlying principles thereof, that they may employ them in the numerous modifications contemplated within the scope of the claims. These drawings have been annexed as a part of this disclosure, like characters of reference denoting corresponding parts throughout the several figures, of which:—

Figure 1 is an end view of the traveling table of a machine tool showing my proposed mechanism applied thereto. Fig. 2 is a section on line 2—2 of Fig. 1, showing the position of the cover-plates during the forward or left hand travel of the table. Fig. 3 is a detail view of the restraining mechanism, showing it rocked against its spring tension by the return travel of the stop member, and Fig. 4 is a similar view showing the gravity wipe-pawl tripped by the forward travel of the stop member.

Continuing now to describe the illustrated adaptation of this invention it will be preliminarily stated that the traveling table A is adapted to reciprocate upon slide-ways 1 and 2 of a supporting carriage B which may be stationary or movable as the particular machine to which it is applied may require.

It has been found that chips and grindings resulting from the tooling or grinding operations of machine tools are injurious to frictional bearing surfaces and especially to slide-ways such as are shown in the drawings and when the table is of considerable weight, therefore the main object in view during the conception of this invention has been to design means for protecting said slide-ways during their exposure caused by the table travel.

In its preferred form I have shown the carriage B as provided with a flat slide-way 1 and a V-slide-way 2, upon which the table A travels. Toward either side of the table, directly above the slide-ways 1 and 2, I form apertures 3 and 4 which provide clearance for the cover-plates C and D. Secured to the end of the table are guide-plates 5 and 6, which are slotted to receive the cover-plates and to provide a snug fit therebetween to cause the table and cover-plates to move as a unit except when said cover-plates are restrained against movement by other means.

Projecting downwardly from the outer ends of the cover-plates are stop members 7 and 8 and immediately below is a restraining device which is mounted on a bracket 9 secured to the carriage B and which is constructed as follows: Journaled in the bracket 9 is a rock-shaft 10 to which is secured a swinging frame 11 having trunnions 12 carrying gravity wipe-pawls 13 which are positioned approximately coincident to the center line of the slide-ways. The lower weighted end 14 of the wipe-pawls contact with the projecting ends of the rock-shaft 10. The wipe-pawls have a free counter-clockwise movement and are restricted in an opposite direction, when engaged by the cover plate, by the rock-shaft 10 with the pawl and frame when thus engaged, swinging as a unit.

Within a recess 15 having a protecting cover 16, a spring 17 is coiled around the shaft 10, and exerts a counter-clockwise tension upon the frame 11 by reason of its ends bearing against the under sides of the bracket 9 and protecting cover 16 of said frame. A stop lug 18 projecting inwardly from the frame 11 limits its movement in one direction.

Operation: With reference to Fig. 2, let it be assumed that the table A is traveling to the left. The stop member 7 is held against movement by the stationary carriage B therefore as the table travels to the left, the cover-plate C is withdrawn from the table to provide a protection for the slide-way 1. When the table starts on its return travel, the cover-plate travels with it as a unit by reason of its frictional fit within the guide-plate 5. When the stop member 7 comes in contact with the upper end of the wipe-pawl 13, said member and its cover-plate are brought to a stop by reason of the tension of the spring 17 being sufficient to overcome the frictional resistance between the guide-plate 5 and the cover-plate C. A continued return travel of the table A brings the guide-plate 5 into engagement with the upper end of the stop member 7 (as shown in dotted lines) after which the wipe-pawl 13 and its supporting frame 11 is rocked in a clockwise direction against the tension of the spring 17 (as shown in Fig. 3). The member 7 passing beyond the pawl 13 allows the parts to assume their normal position shown in Fig. 2. On the next forward travel of the table the member 7 wipes by the wipe-pawl 13 as shown in Fig. 4. If this restraining mechanism were not provided the length of cover-plate exposed during the forward travel of the table (which may at times be one half the length of the table) would upon the return travel project beyond the table a considerable distance, thereby requiring fully twice as much floor space per machine as is required when such a restraining device is employed.

It will be apparent that my proposed construction amply protects the slide-ways from falling chips and grinding dust without increasing the floor space required for the usual operations of the machine.

Having thus described my invention, I claim as new and desire to secure by Letters Patent of the United States:—

1. A machine-tool of the nature disclosed combining a reciprocating table, a slide-way therefor, a cover-plate for said slide-way mounted in extensible relation with said table, means for arresting the movement of the cover-plate in one direction, and means for arresting the movement of the cover-plate in the opposite direction until the table has reached a predetermined position.

2. A machine-tool of the nature disclosed combining a reciprocating table, a slide-way therefor, a cover-plate for said slide-way mounted in extensible relation with said table, means for arresting the movement of the cover-plate in one direction, a member providing resistance against movement of the cover-plate in the opposite direction relative to the table and automatic restraining mechanism to overcome said resistance and arrest the movement of the cover-plate relative to the slide-way until positively moved by the table.

3. A machine-tool of the nature disclosed combining a reciprocating table, a slide-way therefor, a cover-plate for said slide-way mounted in extensible relation to the table, means for arresting the movement of the cover-plate in one direction, a member providing resistance against movement of the cover-plate in the opposite direction relative to the table and automatic restraining mechanism to overcome said resistance to arrest the movement of the cover-plate relative to the slide-way until the table has reached a predetermined position.

4. A machine-tool of the nature disclosed combining a reciprocating table, a slide-way therefor, a cover-plate for said slide-way mounted in extensible relation to the table, means for arresting the movement of the cover-plate in one direction when the table has reached a predetermined position, and a second means for arresting the movement of the cover-plate in the opposite direction until the table has reached a predetermined position.

In witness whereof, I hereunto subscribe my name, as attested by the two subscribing witnesses.

GEORGE C. KIMMEL.

Witnesses:
OLIVER B. KAISER,
LOUISE A. BECK.

---

Copies of this patent may be obtained for five cents each, by addressing the "Commissioner of Patents, Washington, D. C."